(12) United States Patent
Elm et al.

(10) Patent No.: US 8,093,513 B2
(45) Date of Patent: Jan. 10, 2012

(54) DEVICE FOR GUIDING CABLES OR WIRES

(75) Inventors: Oskar Elm, Eschenburg (DE); Matthias Müller, Dillenburg (DE); Horst Besserer, Herborn (DE); Rolf Benner, Herborn-Amdorf (DE)

(73) Assignee: Rittal GmbH & Co. KG, Herborn (DE)

( * ) Notice: Subject to any disclaimer, the term of this patent is extended or adjusted under 35 U.S.C. 154(b) by 759 days.

(21) Appl. No.: 12/083,849

(22) PCT Filed: Nov. 15, 2006

(86) PCT No.: PCT/EP2006/010937
§ 371 (c)(1),
(2), (4) Date: Apr. 18, 2008

(87) PCT Pub. No.: WO2007/059884
PCT Pub. Date: May 31, 2007

(65) Prior Publication Data
US 2009/0044973 A1 Feb. 19, 2009

(30) Foreign Application Priority Data
Nov. 25, 2005 (DE) .......................... 10 2005 056 215

(51) Int. Cl.
*H02G 3/22* (2006.01)

(52) U.S. Cl. ....... 174/650; 174/660; 174/72 A; 174/151; 248/56

(58) Field of Classification Search .......... 174/650, 174/152 G, 153 G, 152 R, 135, 656, 659, 174/660, 663, 668, 142, 153 R, 151, 657, 174/72 A, 653, 362, 77 R; 16/2.1, 2.2; 248/68.1, 248/56

See application file for complete search history.

(56) References Cited

U.S. PATENT DOCUMENTS

| | | | | | |
|---|---|---|---|---|---|
| 4,677,253 | A | * | 6/1987 | Blomqvist | 174/362 |
| 4,702,444 | A | * | 10/1987 | Beele | 174/151 |
| 4,919,372 | A | * | 4/1990 | Twist et al. | 248/56 |
| 5,108,060 | A | * | 4/1992 | Beele | 248/56 |
| 6,118,076 | A | * | 9/2000 | Damm et al. | 174/77 R |
| 6,390,135 | B1 | | 5/2002 | Shimizu | |
| 6,521,840 | B1 | * | 2/2003 | Kreutz | 174/151 |
| 6,668,864 | B2 | | 12/2003 | Shimizu | |
| 7,005,579 | B2 | * | 2/2006 | Beele | 174/653 |

(Continued)

FOREIGN PATENT DOCUMENTS

DE   37 15 945 A1   1/1988

(Continued)

*Primary Examiner* — Angel R Estrada
(74) *Attorney, Agent, or Firm* — Pauley Petersen & Erickson (57) ABSTRACT

A device which is used to guide cables or wires through walls. The device includes a maintaining device which is connected to two or more cable maintaining elements that surround, in a frame-like manner, a mounting area which includes a through-opening, and the cable maintaining elements are arranged in the region of the through-openings. According to this invention, the mounting area has a matrix-form and includes at least two mounting lines and at least two mounting gaps which enable the mounting area to be equipped in a simple and easy manner. The mounting lines and the mounting gaps predefine, respectively, a constant modular dimension, and the cable maintaining elements are dimensioned with respect to the width and the longitudinal extension in the direction of the mounting line and direction of the mounting gap, so that the width and the length correspond to a multiple whole number of the modular dimension.

24 Claims, 4 Drawing Sheets

U.S. PATENT DOCUMENTS

| | | |
|---|---|---|
| 7,288,730 B2 | 10/2007 | Habel et al. |
| 7,371,969 B2 * | 5/2008 | Hedstrom .................... 174/151 |
| 2006/0185875 A1 | 8/2006 | Habel et al. |
| 2009/0121091 A1 | 5/2009 | Elm et al. |

FOREIGN PATENT DOCUMENTS

| | | |
|---|---|---|
| DE | 40 20 180 C1 | 7/1991 |
| DE | G 92 11 740.6 | 12/1992 |
| DE | G 93 01 863.0 | 5/1993 |
| DE | G 93 05 975.2 | 9/1993 |
| DE | 197 21 659 A1 | 11/1998 |
| DE | 299 10 832 U1 | 10/1999 |
| DE | 199 21 403 A1 | 11/1999 |
| DE | 299 24 314 U1 | 11/2002 |
| DE | 299 24 372 U1 | 12/2002 |
| DE | 103 13 989 A1 | 10/2004 |
| DE | 10 2006 032 834 A1 | 9/2007 |
| EP | 1 710 882 A2 | 10/2006 |
| GB | 2 337 870 A | 12/1999 |
| JP | 56-15224 | 2/1981 |
| JP | 2-22013 | 2/1990 |
| JP | 2001061213 | 3/2001 |
| WO | WO 2004/086583 A1 | 10/2004 |

* cited by examiner

DEVICE FOR GUIDING CABLES OR WIRES

BACKGROUND OF THE INVENTION

1. Field of the Invention

This invention relates to a device for guiding cables or wires through walls, having a holding device with which two or more cable holders are connected, wherein the holding device surrounds a mounting area which contains a frame-like lead-through opening, and wherein the cable holders are arranged in the area of the lead-through opening.

2. Discussion of Related Art

A guiding device is known from German Patent Reference DE 92 11 740 U1. In this case a frame-shaped holding device is used, which forms the lead-through opening. The holding device has a circumferential strip surrounding the lead-through opening. Cable holders made of an elastic rubber material are placed on this strip.

Here, the cable holders cover a partial area of the lead-through opening. A clamping element, with which the individual cable holders can be clamped transversely relative to the cable lead-through direction, is inserted into the remaining partial area. The partial area of this device into which the clamping element is inserted cannot be used for cable guidance.

The clamping element must be accessible from the direction of the front and the rear of the device for clamping it. In the installed state, it is thus necessary to keep the back of the wall on which the device is installed accessible. Also, two persons are needed for mounting, one that clamps the clamping elements at the front, and a second that is located behind the wall and braces the clamping element.

Furthermore, the jigsaw-like method for applying components to the holding element is not simple, because it is necessary to assure that the cable holders of different sizes cover the area of the lead-through opening without gaps, except for the area of the clamping elements. Sometimes, with the clamping element released, the cable holders can drop out of the holding device in an uncontrolled manner, so that installation is not always without problems.

SUMMARY OF THE INVENTION

It is one object of this invention to provide a device of the type mentioned above but which makes possible a simple and clear placement of cable holders in the mounting area.

This object is achieved if the mounting area is designed as a grid, having at least two mounting lines and at least two mounting columns, wherein the mounting lines and the mounting columns each determine a constant grid dimension. The extensions in width and length of the cable holders in their mounting line direction and mounting column direction are of such dimensions that the width and length measurements correspond to a whole-number multiple of the grid dimensions.

A clear placement of the cables/wires is possible as a result of the grid-like division of the mounting area. In the process, the individual cable holders can be arbitrarily arranged in the fields determined by the grid dimensions.

The mounting area can be simply filled without gaps by cable holders or blind pieces.

In one embodiment of this invention, the number of the mounting columns is $\geq 2$ and the number of the mounting lines $=2$, or the number of the mounting columns $=2$ and the number of the mounting lines $\geq 2$. At least in some areas the holding device has a support section which surrounds the lead-through openings, on which the cable holders are placed with a support section.

A strong IP seal can be achieved if the cable holders have a non-deformable cable sheath, which is surrounded by a seal and maintained on the holding device. The seal can be placed against a sealing face of the holding device and the seals of the one or several adjoining cable holders. The stable cable sheaths can be dependably anchored in the holding device. The seals form defined sealing locations.

In one embodiment of this invention, at least one of the cable holders, or at least two groups of cable holders, can be connected with the holding device, respectively independently of each remaining cable holder, by connecting elements assigned to the cable holders.

With the connecting elements, which are individually assigned to the cable holders, the user can release the desired cable holder in an individually directed manner. The remaining cable holders remain fixed in place during this step.

Thus, the manipulation of the device is easily monitored and placement/removal of the cable holders is possible. For example, one or several locking elements can be assigned to each cable holder, or a group of cable holders can be fixed in place by one or several locking elements.

In accordance with one embodiment of this invention, at least one of the cable holders, or at least two groups of cable holders, can be connected with the holding device, respectively independently of each remaining cable holder, by connecting elements assigned to the cable holders.

Thus, the cable holders can always be released and fixed in place from the direction of the front of the wall, which allows mounting by a single person. In addition, it is possible to design the installation conditions on the back of the wall independently of the cable lead-through.

In order not to limit the easy passage of cables equipped with plugs through the lead-through opening, it is possible in accordance with this invention to arrange or provide the connecting elements outside of the lead-through opening.

A secure support and strain relief for the cable holders results in a simple manner if the cable lead-through direction the cables holders are positively connected with the holding device and are supported opposite the cable lead-through direction by each connecting element.

In this case, a fastening piece of the connecting element can extend over the cable holders on their side facing away from the support section.

A simple, tool-free locking of the connecting element can be achieved if the connecting element is fixed in place on the holding device in the locked position by a snap-in connection.

Exact positioning of the cable holders can be simply achieved and maintained if the connecting elements and/or the holding device have positioning receptacles, on which the cable holders are maintained transversely with respect to the cable lead-through direction.

Dependable sealing of the cable holders can be achieved if the holding device and/or the connecting elements have clamping pieces which sealingly clamp the cable holders in the mounted position transversely with respect to the cable lead-through direction. A functional separation between the locking device and the seal and the connecting elements and the clamping pieces is thus achieved.

A strong IP seal can be achieved if the holding device supports the clamping pieces, the clamping pieces can be adjusted transversely with respect to the cable lead-through direction, and the adjustment movement of the clamping pieces is blocked in the mounted position by the connecting elements.

In accordance with one embodiment of this invention, the cable holders have a non-deformable cable sheath, which is surrounded by a seal and is maintained on the holding device. The seal is placed against a circumferential sealing face of the holding device and the seals of the one or several adjoining cable holders, the stable cable sheath, which can for example include one or several plastic injection-molded parts, can be dependably supported on the holding device. For discharging its function, the material and the design of the seal can then be provided independently of the cable sheath.

In one alternative of this invention, the cable holder has a cable sheath enclosing at least one cable lead-through and has two or more partial bodies, which can be displaced relative to each other, by which the cable lead-through can be opened transversely with respect to the cable guidance direction, and the cable sheath can be fixed in place directly on the holding device.

Thus, pre-assembled cables with plugs already fixed on them can be inserted into the cable lead-through of the cable sheath, which can be opened. Because the cable sheath is directly connected with the holding device, it is possible to realize a simple, compact construction with few components.

BRIEF DESCRIPTION OF THE DRAWINGS

This invention is explained in greater detail in view of an exemplary embodiment represented in the drawings, wherein.

DETAILED DESCRIPTION OF THE INVENTION

FIGS. 1 to 4 show a holding device 10 made of a plastic material and embodied as one piece. Together with lateral elements 12 and 13, the holding device 10 forms a frame 11 that surrounds a lead-through opening 14. The lead-through opening 14 is solely delimited by a support section 15, which projects away from the lateral elements 12, 13 at right angles. In the area of or near the lead-through opening 14, the holding device 10 forms a mounting area composed in a grid-like manner of two mounting lines and four mounting columns. The mounting area can be filled with cable holders 30, as explained later. The support section 15 has positioning receptacles 16 embodied in the form of depressions on its front.

These are arranged and spaced apart from each other in accordance with the grid dimensions, wherein the grid dimensions correspond to the uniform grid dimensions determined by the mounting lines and mounting columns.

Figure 1:
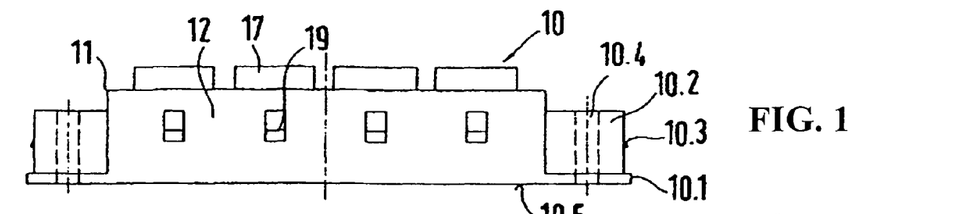
FIG. 1 is a lateral view of a holding device for guiding cables or wires through a wall.
Figures 2, 3:
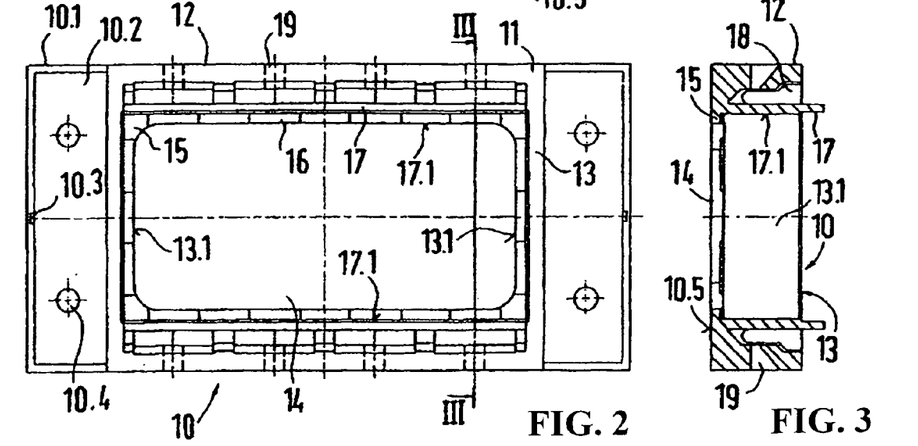
FIG. 2 shows the holding device in accordance with FIG. 1, in a top view.
FIG. 3 shows a sectional view of the holding device taken along the section line identified by III-III in FIG. 2.
Figure 4:
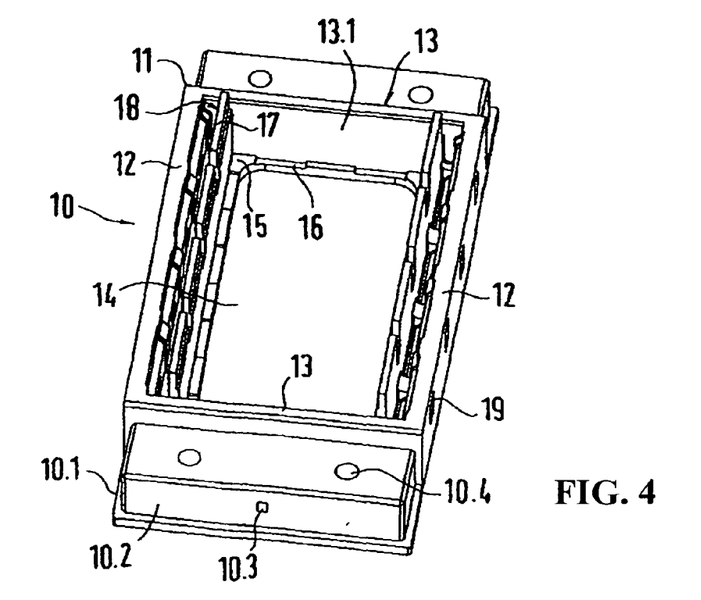
FIG. 4 shows the holding device in accordance with FIGS. 1 to 3, in an isometric view.

As FIG. 3 shows, clamping pieces 17 are formed on the lateral elements 12 in the area of or near the support sections 15. In this case, the clamping pieces 17 extend continuously between the lateral elements 13 and are connected to the ends of these.

Thus, the clamping pieces 17 and the lateral elements 13 form a circumferential sealing face 17.1, 13.1 facing the lead-through opening 14. The clamping pieces 17 project forward by gripping elements at the front of the holding device 10. In the area facing away from the lead-through opening 14, a free space 18 is formed at the rear behind the clamping pieces 17. The clamping pieces 17 can be pivoted in it in a spring-elastic manner around the connecting section formed in the transition area between the clamping pieces 17 and the support section 15.

The lateral elements 13 have two shoulders 10.1, which are facing away from the lead-through opening 14 and are designed in a box-like manner. They are delimited by a projecting edge 10.1 and are respectively penetrated by two screw receptacles 10.4.

The shoulders 10.2 each has a snap-in element 10.3 on the side. As shown in FIG. 3, for example, the holding device 10 has a wall attachment side formed by a flat contact face 10.5. With this contact face 10.5, and with the interposition of a seal, the holding device 10 can be attached to a wall around a wall opening so that the wall opening and the lead-through opening 14 are aligned.

Figure 8:
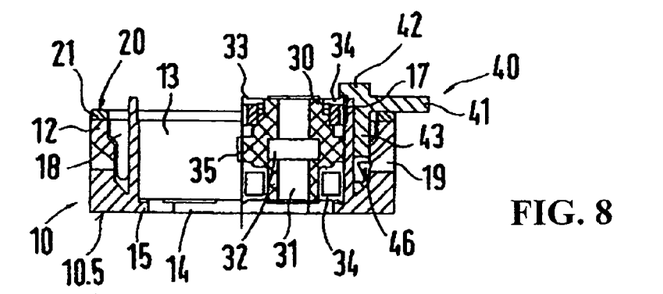
FIG. 8 shows an arrangement with the holding device in accordance with FIGS. 1 to 4 and the cover in accordance with FIGS. 5 to 7, as well as with a cable holder along the section line identified by VIII-VIII in FIG. 9.

As FIG. 8 shows, it is possible to insert connecting elements 40 into the free space 18 behind the clamping pieces 17. The details of the design of the connecting elements 40 are shown in FIGS. 11 to 15. As these drawings show, the connecting element 40 has a strip 43 and a handle 41 formed on it at right angles. Also, on the side facing away from the handle 41, the strip 43 has a fastening piece 42 arranged at right angles with respect to the strip 43. The fastening piece 42 has a recess 44 on its underside, whose dimensions correspond to the positioning receptacles 16 of the support section 15 of the holding device 10.

At its end facing away from the fastening piece 42, the strip 43 has an opening, at which it has a snap-in element 46. An oblique-shaped section 47, as well as two laterally protruding stops 45, are also provided in the area of or near the free end of the strip 43. The stops 45 are embodied as cylindrical pins.

As FIG. 8 shows, the strip 43 of the connecting elements 40 can be inserted into the free space 18. In the area facing the contact face 10.5, the free space 18 is bordered by an oblique face, which works together with the oblique-shaped section 47 of the connecting element 40. Accordingly, the oblique-shaped section 47 slides up on the oblique face, so that in the mounted position the strip 43 rests against the rear of the clamping piece 17. The snap-in element simultaneously snaps into an associated snap-in receptacle 19, which is cut as an opening into the lateral elements 12 of the holding device 10.

Snap-in can be easily accomplished because the connecting element 40 merely needs to be pressed into the free space 18 with the handle 41.

Figure 5:
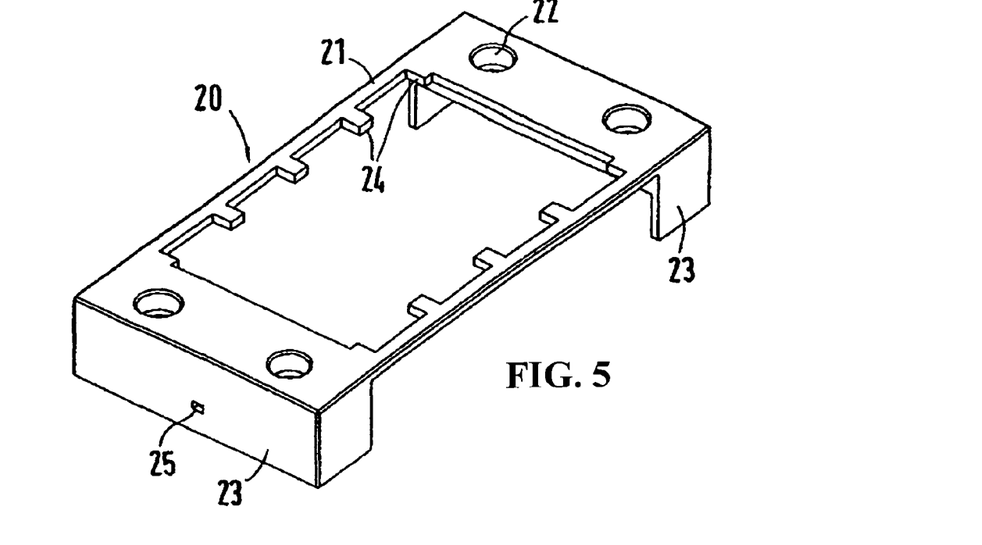
FIG. 5 shows a cover in an isometric view.
Figure 6:
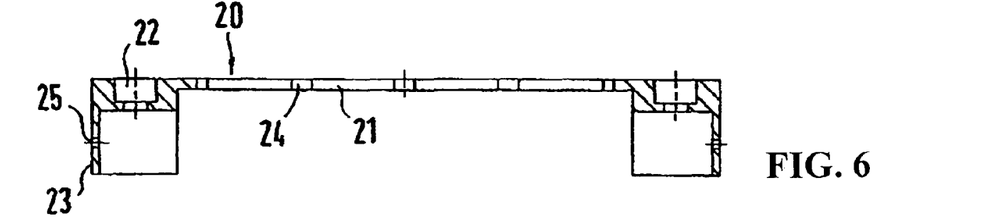
FIG. 6 shows a sectional view of the cover in accordance with FIG. 5, taken along the section line identified by VI-VI in FIG. 7.
Figure 7:
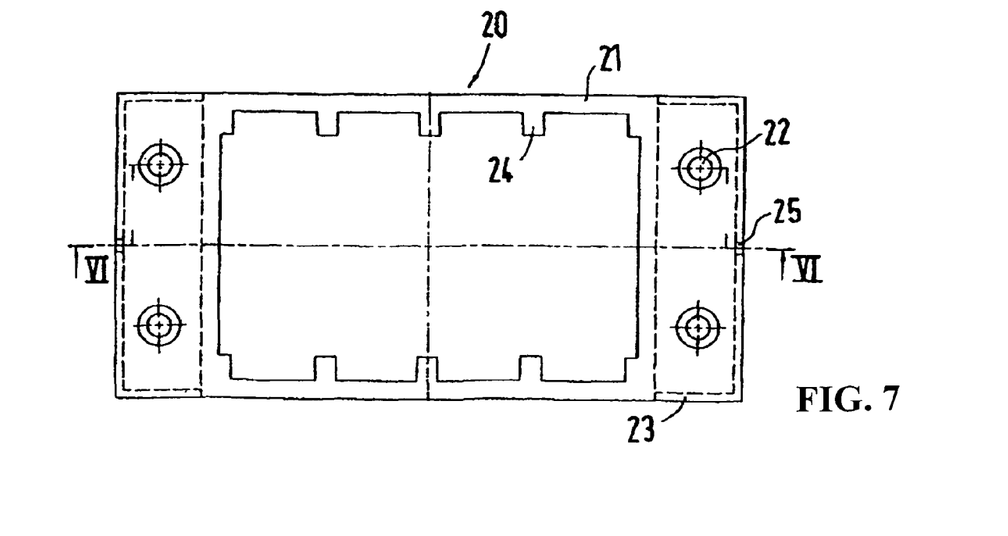
FIG. 7 shows the cover in a top view.

As FIG. 8 shows, a cover 20 is connected with the holding device 10, which fixes the connecting elements 40 secure against loss on the holding device 10. Details of the design of the cover 20 are shown in FIGS. 5 to 7. As FIG. 5 shows, the cover 20 has two strips 21 arranged parallel with respect to each other, which have comb-like protrusions 24. On their longitudinal ends, the strips 21 are connected with box-like edges 23. Screw receptacles 22 penetrate through the edges 23.

The cover 20 can be placed on top of the holding device 10. During this, the edges 23 extend around the shoulders 10.2 of the holding device 10. The cover 20 can be pushed on the holding device 10 until it comes to rest against the edge 10.1. In this position, the snap-in elements 10.3 of the holding device 10 snap into the snap-in receptacles 25 of the cover 20, so that the cover 20 is held secure against loss. Here, the screw receptacles 22 of the cover 20 are also arranged and aligned with respect to the screw receptacles 10.4 of the holding device 10.

As FIG. 8 shows, the strips 21 of the cover 20 rest on the lateral elements 12 of the holding device 10, while the protrusions 24 cover the free space 18. The distance between the protrusions 24 is matched to the spacing of the stops 45 of the connecting element 40. The connecting element 40 can be brought out of its locking position represented in FIG. 8 into an unlocked position. For this purpose, the snap-in element 48 is unlocked by a suitable tool passed through the snap-in receptacle 19, and the connecting element 40 can be pulled out in the direction facing away from the contact face 10.5 with the aid of the handle 41. The pullout movement is limited by the stops 45 which rest against the protrusions 24 of the cover 20.

As FIG. 8 shows, the free space 18 is widened in the area facing the cover 20, so that in the pulled-out state the connecting element 40 can be pivoted outward to a limited extent in the direction of the extension of the handle 41. Then the fastening piece 42 is located outside of the cable lead-through area, so that cable holders 30 can be conveniently inserted.

Figure 9:
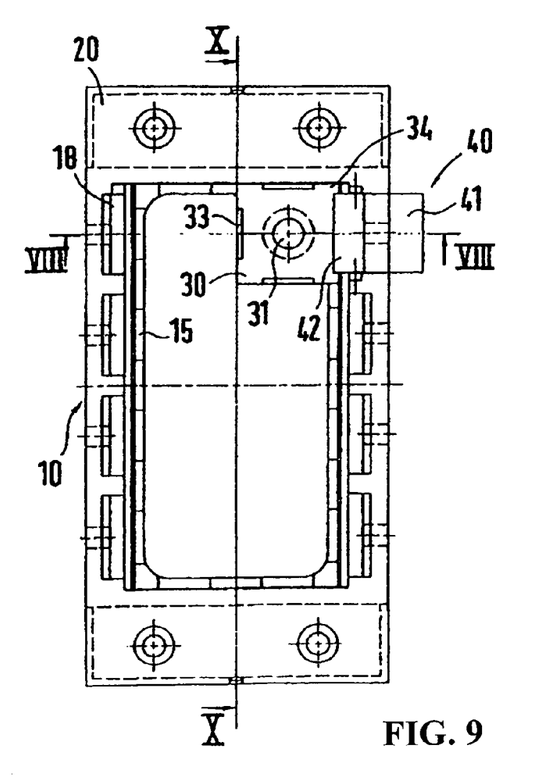
FIG. 9 shows the arrangement in accordance with FIG. 8, in a top view.
Figure 10:
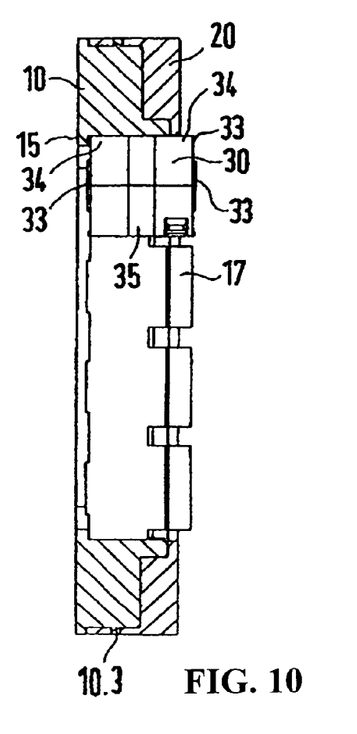
FIG. 10 shows a sectional view of the arrangement in accordance with FIG. 9, taken along the section line identified by X-X in FIG. 9.
Figure 11:
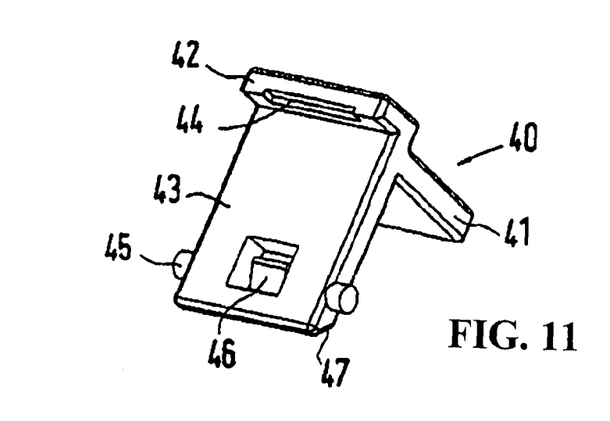
FIGS. 11 to 15 show a connecting element in various views.
Figure 12:
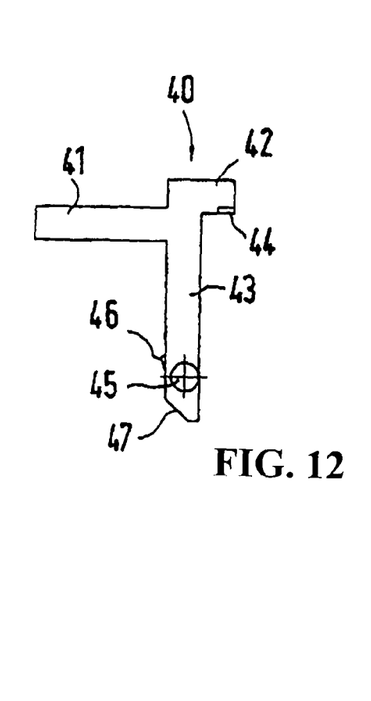
Figure 13:
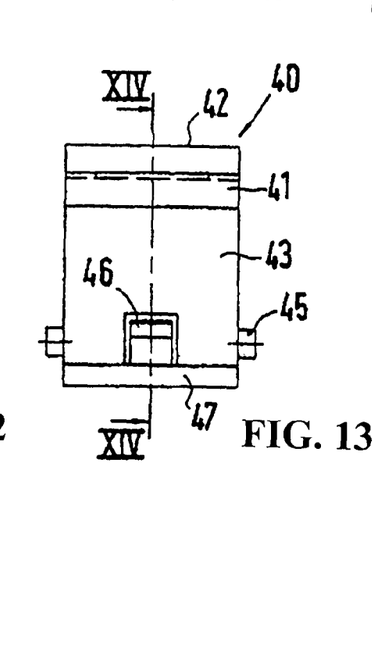
Figure 14:
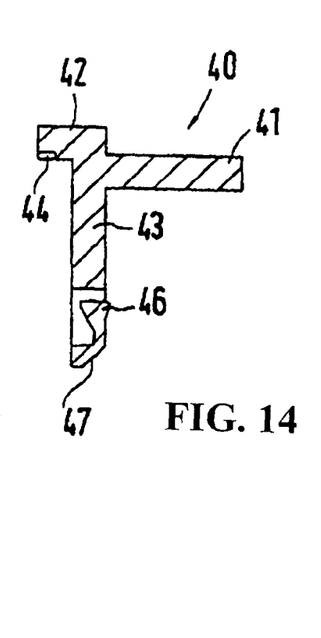
Figure 15:
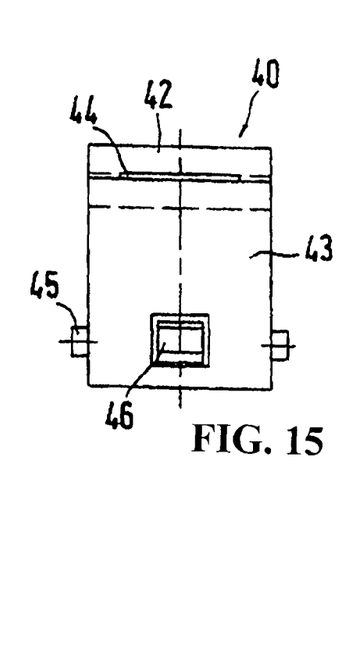

FIGS. 8 to 10 show the design of the cable holders 30.

The cable holders comprise two housing halves, which can be snapped into each other. The cable holder 30 encloses a cable lead-through 31. A sealing element receptacle 32 is provided centered in the cable lead-through 31. A sealing element is placed into the former, which sealingly encloses a cable inserted into the cable lead-through 31.

The cable holder 30 also forms a strain relief, which axially fixes the cable secure against displacement. At their longitudinal ends, the cable holders 30 form support sections 34, with shoulders 33 formed on them, around the cable lead-through 31. In their dimensions, the shoulders 33 are matched to the shape of the positioning receptacles 16 of the holding device 10, or to the recesses 44 of the connecting elements 40.

The cable holders 30 are designed symmetrically with respect to the center transverse plane. A circumferential sealing element 35 of a soft resilient material surrounds the cable holder 30 in the center transverse plane.

The method of mounting the device for the lead-through of cables is described.

First, the housing halves of the cable holder 30 are placed around a cable, which can be pre-equipped with plugs, and are snapped together. The cable, possibly with the plug, is pushed through the lead-through opening 14. The lead-through opening 14 is sufficiently large so that even large size plugs can be inserted. Thereafter, the cable holder 30 is placed into the holding device 10 at the desired position in the mounting grid. Here, with its support section 34 the cable holder 30 sits on the support section 15 of the holding device 10. Exact positioning is achieved by the shoulders 33 of the cable holder 30, which engage the positioning receptacles 16 of the support section 15. Subsequently, the associated connecting element 40 is pushed into the locking position by means of the handle 41. During this, the shoulder 33 facing the fastening piece 42 of the connecting element 40 engages the recess 44. In the mounted position, the cable holder 30 is positively fixed in place in the cable lead-through direction on the fastening piece 42 and the support section 15.

Besides the cable holder 30 represented in FIG. 9, further cable holders 30 or blind pieces are inserted.

In this case, the cable holders 30 can all have the same geometry, or cable holders 30 are used, which occupy several installation locations in the holding device 10. Here, the dimensions of the cable holders 30 in their longitudinally and transversely extending direction shown in accordance with FIG. 9 are selected to be in kit form.

Accordingly, the longitudinal and/or transverse extension always corresponds to a multiple of the longitudinal and/or transverse extension of the cable holders 30 represented in FIG. 9.

In other words, the dimensions of the cable holders 30 are always selected so that the longitudinal and/or transverse extension corresponds to a multiple of the grid dimension determined by the positioning receptacles 16. Thus, it is possible to fill the cable lead-through area completely with cable holders 30 or, in case no cable lead-throughs are desired at defined locations, with blind pieces. At least one connecting element 40 is assigned to each cable holder 30 or blind piece.

In the contact area with the holding device 10, the cable holders 30 or blind pieces are sealed by the circumferential seal 35 at the sealing face 13.1 or 17.1 of the holding device 10. The adjoining cable holders 30 or blind pieces seal by seals 35 resting on each other.

As mentioned above, the device can be installed on a wall around an opening in the wall. For this purpose, screws are passed through the screw receptacles 22 of the cover and the screw receptacles 10.4 aligned therewith of the holding device 10, and are clamped to the wall.

The invention claimed is:

1. A device for guiding cables or wires through walls, having a holding device (10) with which at least two cable holders (30) are connected, wherein the holding device (10) surrounds a mounting area which contains a frame lead-through opening (14), and the cable holders (30) are arranged near the lead-through opening (14), the device comprising:
   a support section (15) delimiting the lead-through opening (14);
   a plurality of positioning receptacles (16) formed on the support section (15), wherein each of the plurality of positioning receptacles (16) engages a shoulder (33) of one of the at least two cable holders (30); and
   the mounting area being a grid determined by the positioning receptacles (16), the grid having at least two mounting lines and at least two mounting columns, the mounting lines and the mounting columns each determining a constant grid dimension, and extensions in a width and a length of the cable holders (30) in their mounting line direction and mounting column direction being dimensioned so that width and length measurements correspond to a whole-number multiple of the grid dimensions.

2. The device in accordance with claim 1, wherein a first number of the mounting columns is $\geq 2$ and a second number of the mounting lines $=2$, or the first number of the mounting columns $=2$ and the second number of the mounting lines $\geq 2$, and at least in some areas the holding device (10) has a support section (34) which surrounds the lead-through openings (14) on which the cable holders (30) are placed with a support section (34).

3. The device in accordance with claim 2, wherein the cable holders (30) have a non-deformable cable sheath surrounded by a seal (35) and maintained on the holding device (10), and the seal (35) is placed against a sealing face (13.1, 17.1) of the holding device (10) and the seals (35) of each adjoining cable holder (30).

4. The device in accordance with claim 3, wherein at least one of the cable holders (30), or at least two groups of the cable holders (30) are connectible with the holding device (10), respectively independently of each remaining cable holder (30) by connecting elements (14) assigned to the cable holders (30).

5. The device in accordance with claim 4, wherein the holding device (10) has a wall fastening side for connection with a wall, connecting elements (40) are releasably connected with the holding device (10) by a locking arrangement, and the connecting element (40) is positionable into and out of a locking position from a direction of a side facing away from a wall fastening side.

6. The device in accordance with claim 5, wherein the connecting elements (40) are arranged outside of the lead-through opening.

7. The device in accordance with claim 6, wherein in a cable lead-through direction the cables holders (30) are positively connected with the holding device (10) and are supported opposite a cable lead-through direction by the connecting elements (40).

8. The device in accordance with claim 7, wherein a fastening piece (42) of the connecting element (40) extends over the cable holders (30) on a side facing away from the support section (34).

9. The device in accordance with claim 1, wherein the cable holders (30) have a non-deformable cable sheath surrounded by a seal (35) and maintained on the holding device (10), and the seal (35) is placed against a sealing face (13.1, 17.1) of the holding device (10) and the seals (35) of each adjoining cable holder (30).

10. The device in accordance with claim 1, wherein at least one of the cable holders (30), or at least two groups of the cable holders (30) are connectible with the holding device (10), respectively independently of each remaining cable holder (30) by connecting elements (40) assigned to the cable holders (30).

11. The device in accordance with claim 1, wherein the holding device (10) has a wall fastening side for connection with a wall, connecting elements (40) are releasably connected with the holding device (10) by a locking arrangement, and the connecting element (40) is positionable into and out of a locking position from a direction of a side facing away from a wall fastening side.

12. The device in accordance with claim 1, wherein connecting elements (40) are arranged outside of the lead-through opening.

13. The device in accordance with claim 1, wherein in a cable lead-through direction the cables holders (30) are positively connected with the holding device (10) and are supported opposite a cable lead-through direction by connecting elements (40).

14. The device in accordance with claim 1, wherein a connecting element (40) is fixed in place on the holding device (10) in a locked position by a snap-in connection.

15. The device in accordance with claim 1, wherein each of the cable holders (30) is maintained on one of the positioning receptacles (16) transversely with respect to a cable lead-through direction.

16. The device in accordance with claim 1, wherein the cable holder (30) has a cable sheath enclosing at least one cable lead-through (31) and has at least two partial bodies displaceable relative to each other, by which the cable lead-through (31) can be opened transversely with respect to the cable guidance direction, and the cable sheath is fixed in place directly on the holding device (10).

17. A device for guiding cables or wires through walls, having a holding device (10) with which at least two cable holders (30) are connected, wherein the holding device (10) surrounds a mounting area which contains a frame lead-through opening (14), and the cable holders (30) are arranged near the lead-through opening (14), the device comprising:
the mounting area being a grid, having at least two mounting lines and at least two mounting columns, the mounting lines and the mounting columns each determining a constant grid dimension, and extensions in a width and a length of the cable holders (30) in their mounting line direction and mounting column direction being dimensioned so that width and length measurements correspond to a whole-number multiple of the grid dimensions; and
wherein a fastening piece (42) of a connecting element (40) extends over the cable holders (30) on a side facing away from the support section (34).

18. The device in accordance with claim 17, wherein the connecting element (40) is fixed in place on the holding device (10) in a locked position by a snap-in connection.

19. The device in accordance with claim 18, wherein at least one of the connecting elements (40) and the holding device (10) has positioning receptacles (16) on which the cable holders (30) are maintained transversely with respect to the cable lead-through direction.

20. The device in accordance with claim 19, wherein at least one of the holding device (10) and the connecting elements (40) have clamping pieces (17) which sealingly clamp the cable holders (30) in a mounted position transversely with respect to the cable lead-through direction.

21. The device in accordance with claim 20, wherein the holding device (10) supports the clamping pieces (17), the clamping pieces (17) are adjustable transversely with respect to the cable lead-through direction, and an adjustment movement of the clamping pieces (17) is blocked in the mounted position by the connecting elements (40).

22. The device in accordance with claim 21, wherein the cable holder (30) has a cable sheath enclosing at least one cable lead-through (31) and has at least two partial bodies displaceable relative to each other, by which the cable lead-through (31) can be opened transversely with respect to the cable guidance direction, and the cable sheath is fixed in place directly on the holding device (10).

23. A device for guiding cables or wires through walls, comprising:
a holding device (10) with which at least two cable holders (30) are connected, the holding device (10) including lateral elements (12) and surrounding a mounting area which contains a frame lead-through opening (14), wherein the cable holders (30) are arranged near the lead-through opening (14);
clamping pieces (17) formed on the lateral elements (12) which sealingly clamp the cable holders (30) in a mounted position transversely with respect to a cable lead-through direction;
free spaces (18) for receiving connecting elements (40), each of the free spaces (18) on a side of one of the clamping pieces (17) that is opposite the mounting area; and
the mounting area being a grid, having at least two mounting lines and at least two mounting columns, the mounting lines and the mounting columns each determining a constant grid dimension, and extensions in a width and a length of the cable holders (30) in their mounting line direction and mounting column direction being dimensioned so that width and length measurements correspond to a whole-number multiple of the grid dimensions.

24. The device in accordance with claim 23, wherein the holding device (10) supports the clamping pieces (17), the clamping pieces (17) are adjustable transversely with respect to the cable lead-through direction, and an adjustment movement of the clamping pieces (17) is blocked in the mounted position by the connecting elements (40).

* * * * *